Figures 1, 2, 3:
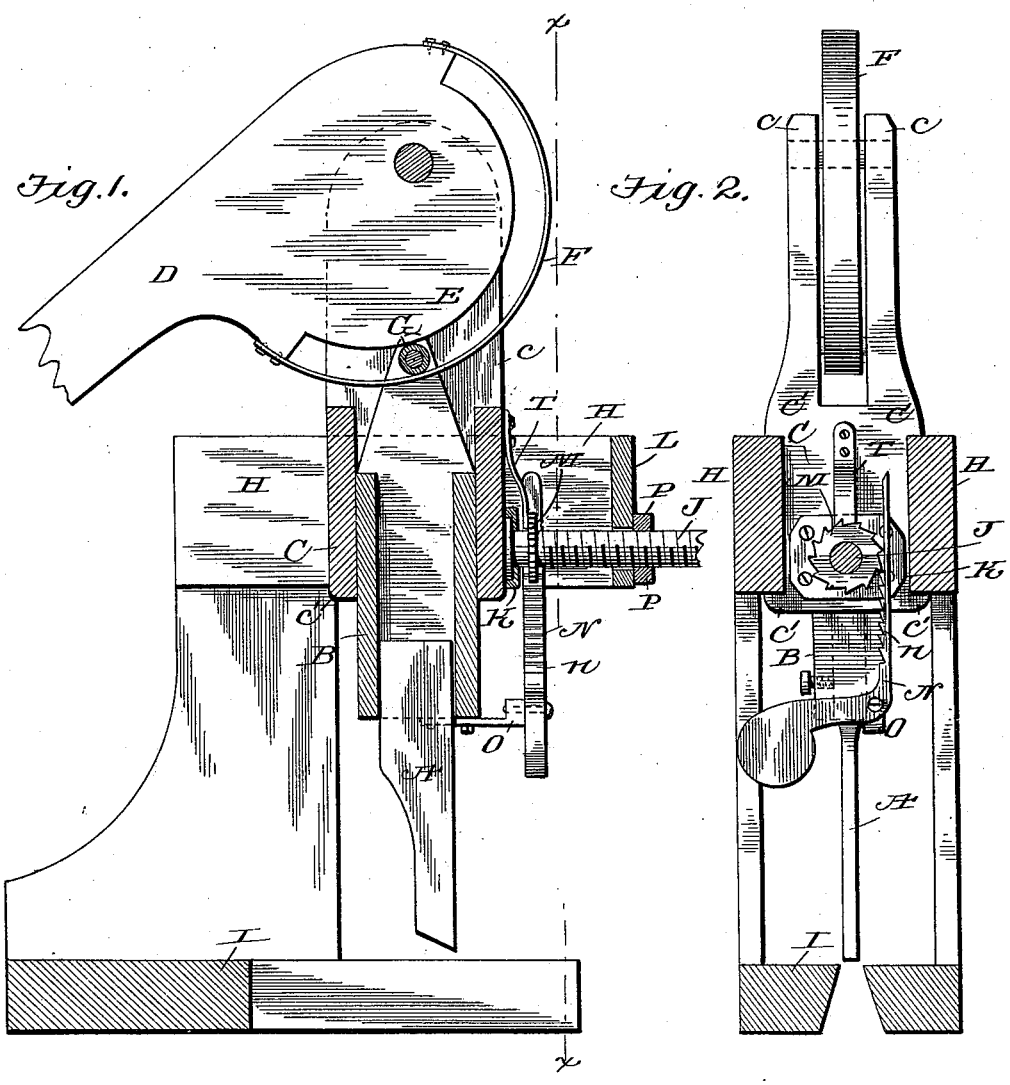

(No Model.)

W. F. EVERETT.
MACHINE FOR CUTTING METAL BARS, &c.

No. 521,785. Patented June 26, 1894.

Witnesses  
Joseph C. Stack.  
Alex Scott

Inventor  
Wilbur F. Everett,  
C. D. Pennebaker, Atty  
by Finckel & Finckel,  
Assoc. Attys.

UNITED STATES PATENT OFFICE.

WILBUR FISK EVERETT, OF RENO, ASSIGNOR TO DANIEL MILLER BULL, OF VERDI, NEVADA.

MACHINE FOR CUTTING METAL BARS, &c.

SPECIFICATION forming part of Letters Patent No. 521,785, dated June 26, 1894.

Application filed April 28, 1894. Serial No. 509,363. (No model.)

*To all whom it may concern:*

Be it known that I, WILBUR FISK EVERETT, a citizen of the United States, residing at Reno, in the county of Washoe and State of Nevada, have invented certain new and useful Improvements in Machines for Cutting or Severing Metal Bars; and I do hereby declare the following to be a full, clear, and exact description of the invention, when taken in connection with the accompanying drawings, such as will enable others skilled in the art to which it appertains to make and use the same.

My invention relates to machines for cutting or severing metal bars; and it consists of substantially the construction and combination of parts represented in the drawings referred to, and particularly pointed out in the claims.

In the drawings, Figure 1 is a longitudinal vertical section of a machine constructed in accordance with my invention, with a part of the operating lever and feed screw omitted; Fig. 2 a transverse vertical section of the same, taken on line $x$—$x$ of Fig. 1; and Fig. 3 is a detail view showing a nut for the feed screw composed of separable parts and a double cam for opening and closing the same.

A is the cutting tool secured to a holder B which is reciprocated in a carriage or recessed block C by the action of a cam lever D pivoted to uprights $c$ formed on the block. The cam E of the lever passes over and engages an anti-friction roller G journaled in ears at the upper end of tool holder B so as to depress the holder and cutting tool, and a metal strip or band F conforming to the shape of the cam is secured to the lever and passes beneath and engages the under side of the roller to raise the holder and tool.

The carriage or block C is formed with shoulders $c'$ $c'$ on its side that fit and slide upon two rails H, H formed above the bed plate I of the frame.

J is a feed screw having a head at one end, rotatably secured to a socketed plate K fastened to the carriage. The other end of the screw passes through a hole in a cross piece or plate L, connecting the ends of rails H, and engages a nut fastened to the cross piece. The hole in the cross piece is slightly larger than the screw so that when it it is desired to move the cutting tool back to a starting point the screw may pass freely through the hole. The nut on the cross piece is composed of two parts P P pivoted at $p$ $p$ and provided at their other ends with pins Q Q that are engaged by two oppositely shaped cam grooves R R formed in a lever S fulcrumed to the cross piece. The cam grooves are so formed that when the lever is moved in one direction the parts of the nut will be separated so as to release the screw and when turned back the parts will come together again and be firmly held by the cams. A ratchet wheel M rigidly secured to screw J is engaged by a series of teeth $n$ on a weighted pawl N pivoted to a bracket O on the lower end of the reciprocating holder B. Spring T fastened at one end to the block C and pressing at its other end against wheel M takes up any lost motion between the block and screw. The series of teeth $n$ extend a distance nearly equal to the greatest length of stroke of the holder B so that one of the teeth of the ratchet wheel will always be engaged by the teeth of the pawl on an upward movement of the tool holder whether it be given a full or partial stroke and thus it is not required that the lever D be always returned to the same point to effect the feed. This obviously enables the machine to be used under circumstances that could not be if the lever must be moved back to the limit of its stroke to cause the feed.

I am aware that machines have been devised for cutting metal bars having parts that act on the main principles of my machine and their use and mode of operation are now well known. But by the particular construction and arrangement of parts in my machine I obtain an exceedingly simple and compact organization of such machines, enhance their use and durability, utilize to a greater extent the power employed, and secure an improved and more certain and effective coaction between the parts.

What I claim as new, and desire to secure by Letters Patent, is—

1. The combination with the guide-way or rails H H and cross piece L, of the carriage or block C movable on said guide-way, lever D having cam E and strip F, tool holder B reciprocable on carriage C and having anti-friction roller G journaled thereto and between cam E and strip F, feed screw J having one end rotatably secured to carriage C and the other engaging a threaded nut on the cross piece, the said nut, ratchet wheel M rigidly secured to screw J, and a pawl N connected with tool holder B and adapted to engage the wheel M, all substantially as shown and described.

2. The combination with the guide-way or rails H H and cross piece L, of the carriage or block C movable on said guide-way, tool holder B reciprocable on carriage C, feed screw J having one end rotatably secured to the carriage and the other engaging a threaded nut on cross piece L, the said nut composed of separable parts, means for opening said parts and also for securing them together, ratchet wheel M rigidly secured to screw J, and a pawl N connected with tool holder B adapted to engage wheel M, all substantially as shown and described.

3. In combination, a guide-way, a carriage or block C movable on said guide-way, a reciprocating tool holder B, feed screw J rotatably secured to said carriage, ratchet wheel M rigidly secured to screw J, and a pawl N having a series of teeth $n$ to engage wheel M extending a distance about that of the maximum stroke of the tool holder, substantially as shown and for the purpose set forth.

In testimony whereof I hereto affix my signature in presence of two witnesses.

WILBUR FISK EVERETT.

Witnesses:
ALVIN M. LAMB,
EDWIN BATES.